May 11, 1948.  C. S. ROBINSON  2,441,510
VIBRATION DAMPENING MOUNT
Filed Nov. 2, 1944  3 Sheets-Sheet 1

INVENTOR.
Cecil S. Robinson
BY
Munn, Liddy & Glaccum
Attorneys

Witnesses
Geo. W. Naylor
John H. Glaccum

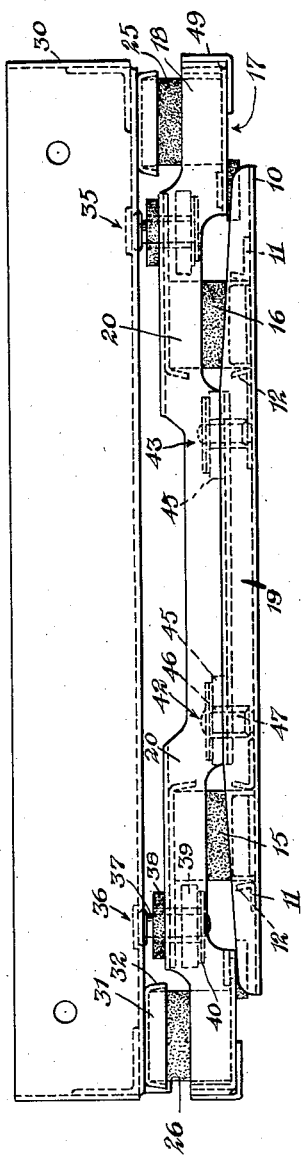
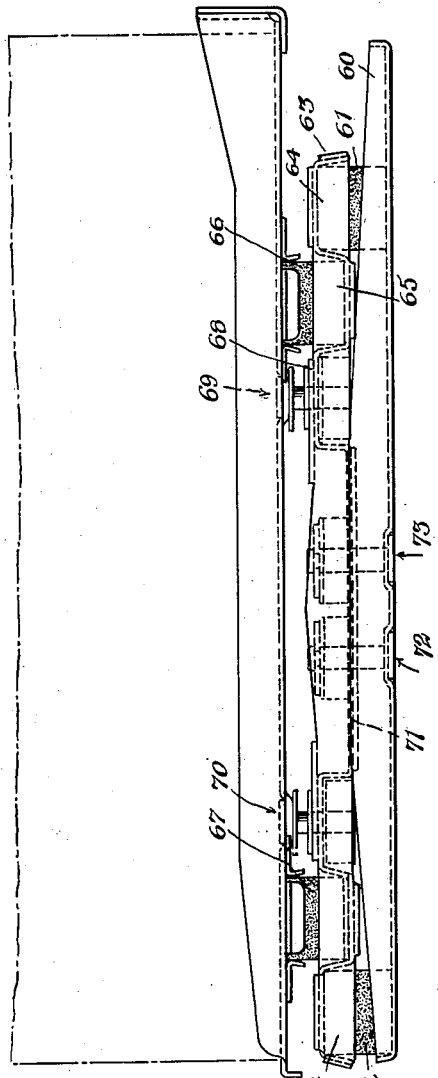

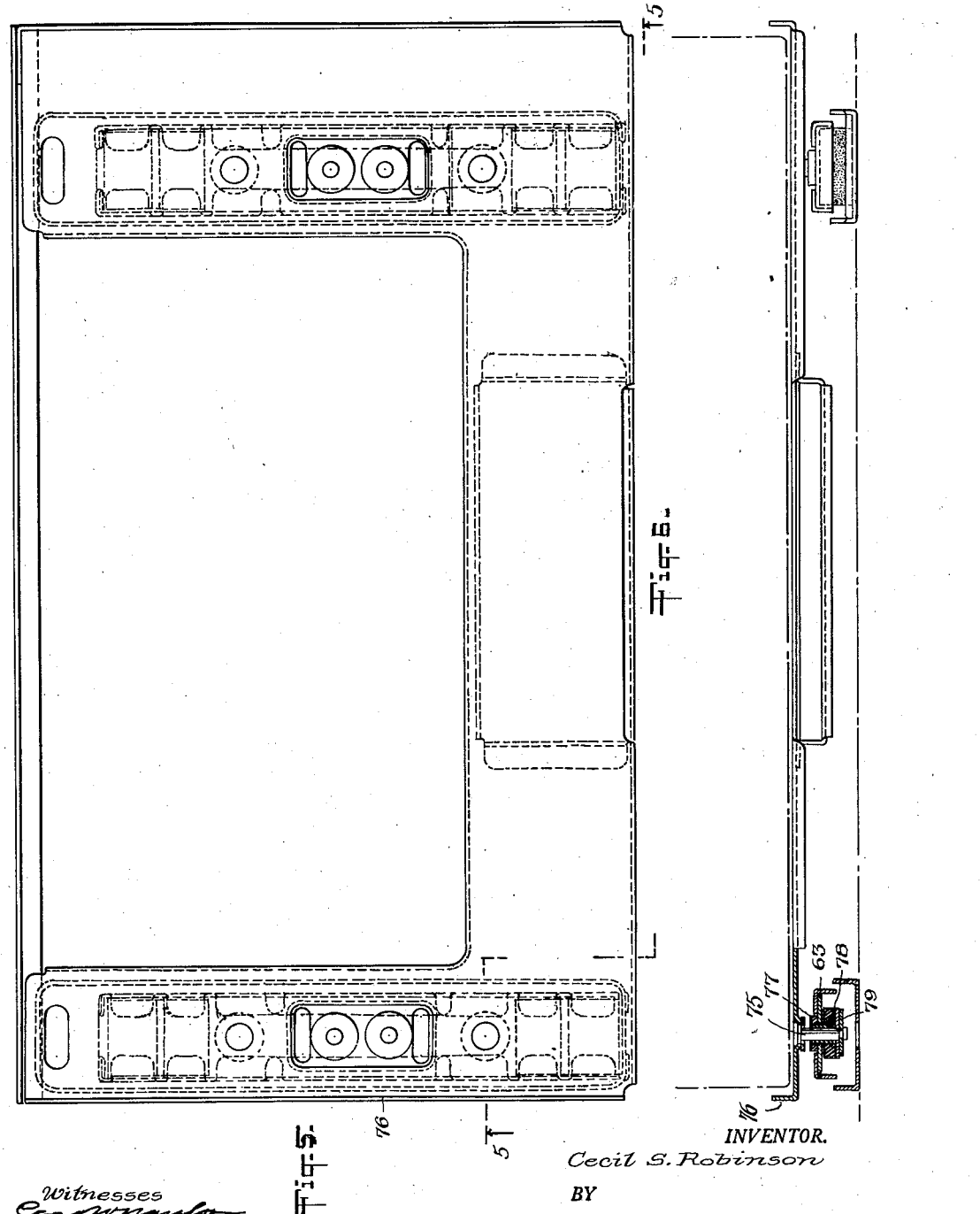

Patented May 11, 1948

2,441,510

UNITED STATES PATENT OFFICE 2,441,510

VIBRATION DAMPENING MOUNT

Cecil S. Robinson, New York, N. Y., assignor of one-half to Dorothy H. Robinson, New York, N. Y.

Application November 2, 1944, Serial No. 561,607

3 Claims. (Cl. 248—22)

1

This invention relates to a vibration dampening mount and more particularly to a mounting for an instrument or other object which is installed in a location where it is subjected to vibration of various types.

While my mounting is not limited in its application it is particularly adapted to the mounting of instruments of various types in vehicles such as airplanes where vibrations are built up due to the action of the motors and the various stresses and strains caused during flight.

It will be appreciated that my invention is equally applicable to other vehicles and installations where similar conditions are met although in a lesser degree. While in the past anti-vibration mountings have been found unsatisfactory where they have been built to meet a constant series of vibrations in a particular plane they are doubly unsatisfactory where the vibrations are not constant but range through various cycles as in an airplane as the speed of the motors is increased and decreased and where majority of the vibrations are in the horizontal rather than the vertical plane. As a result it has been generally found necessary to build instruments much stronger and heavier than would be necessary if the vibrating action and the resultant strain on the equipment could be lessened.

An object of this invention is to provide a mount adaptable for use with various types of instruments and which will minimize, if not eliminate, all types of vibration transmitted through the installation.

A further object is to provide a mounting which will be so constructed that it will be capable of sustaining substantial loading under all conditions without undue fatigue or wearing out of the resilient members.

A still further object is to provide a mounting of the type described which will be compact in its nature and which may be fitted into limited space. It will be appreciated that in certain types of installations, particularly in airplanes, space is a highly important factor and that anti-vibration mountings must be compact and adaptable to the space available.

Other objects and advantages of my device will appear from the accompanying drawings, in which Figure 1 is a plan view of a mounting involving my invention;

Fig. 3 is an end view of the mounting shown in Fig. 1;

2

Figure 1:
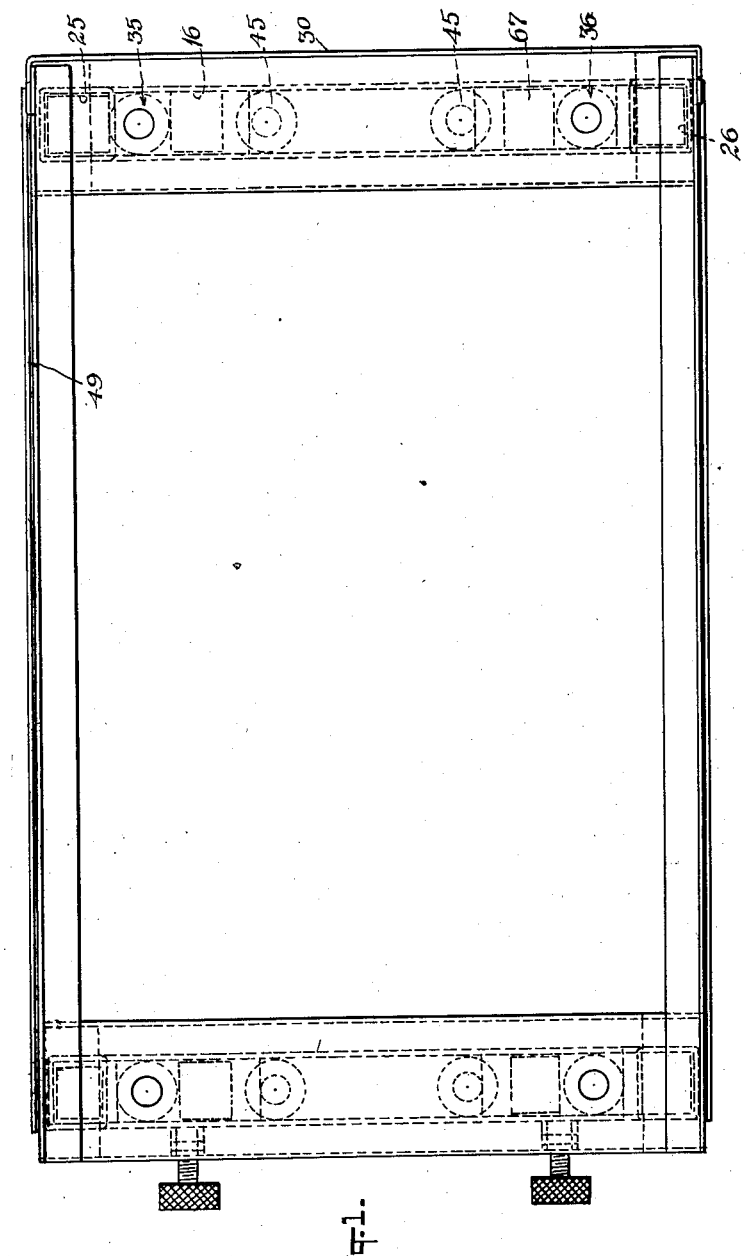

Fig. 4 is an end view of a modification of my invention;

Fig. 5 is a plan view of said modification;

Fig. 6 is a side elevation partly in section taken on the line 5—5 of Fig. 5.

Referring more particularly to Fig. 3 of the drawings, I provide a base bracket 10 which may be fastened through suitable screw holes to the vehicle or other installation in which the device is to be mounted. Mounted on the bracket 10 are a plurality of cushion positioning members 11 constituting angle members bent upon themselves to form a lip 12. These members are formed at either side of the base bracket. Mounted on the base bracket 10 are a pair of cushions 15 and 16 which support the beam 17. The beam 17 is so shaped as to have a lowered portion at the end 18 and at the center 19 with raised portions 20 to accommodate the cushions 15 and 16, thus conserving space and making for a more compact unit.

On either end of the beam 17 are cushions 25 and 26 which support the tray assembly 30. The tray assembly 30 is provided with cup-shaped members 31 having their end 32 slightly flared so as not to confine the action of the cushions 25 and 26. It will be seen that the tray assembly 30 is supported entirely by the cushions 25 and 26 which in turn are supported through the beam 17 on the cushions 15 and 16. It follows that any vibrations entering into the base bracket 10 must pass through the cushions 15 and 16 through the beam 17 and through the cushions 25 and 26 before it can be transmitted to the tray 30.

In order to limit the movement of the tray 30 upon the cushions 25 and 26 a pair of retaining members 35 and 36 are provided. While these may be of any desired construction, a form that has been found to be most satisfactory in safely restraining excessive motion without introducing harmonics or amplification is shown in Fig. 3. The stud 37 secured to the tray 30 extends thru a hole in the beam 17, said hole being larger than the stud 37 so that there is no metallic contact. On the upper side of the beam 17 is a buffer pad 38 of sponge rubber or other easily compressed material. There is provided considerable clearance between the pad 38 and the tray 30 so that upward movements of the beam 17 will not be checked by the action of the pad 38 unless it exceeds the usual amount. Spaced below the beam 17 is a similar buffer cushion or pad 39 carried on a stud 37 and resting on a backing plate 40, which also serves as a safety limit stop to carry the load under shocks which might be too much for rubber. Holes are provided in the pads 38 and 39 somewhat larger than the stud 17. Under normal conditions the beam 17 is perfectly free to vibrate without being checked by the pads 38 and 39; but if the vibrations exceed the clearance provided, the soft, spongy cushions 38 and 39 tend to restrain excessive motion without objectionable bounce or secondary vibration. Similar retaining studs 42 and 43 are provided to limit the movement between the base bracket 10 and the beam 17. As in the case of the members 35 and 36 a buffer pad 45 having openings 46 greater than the pin 47 is provided to limit the movement between the beam and the base bracket.

Figure 2:
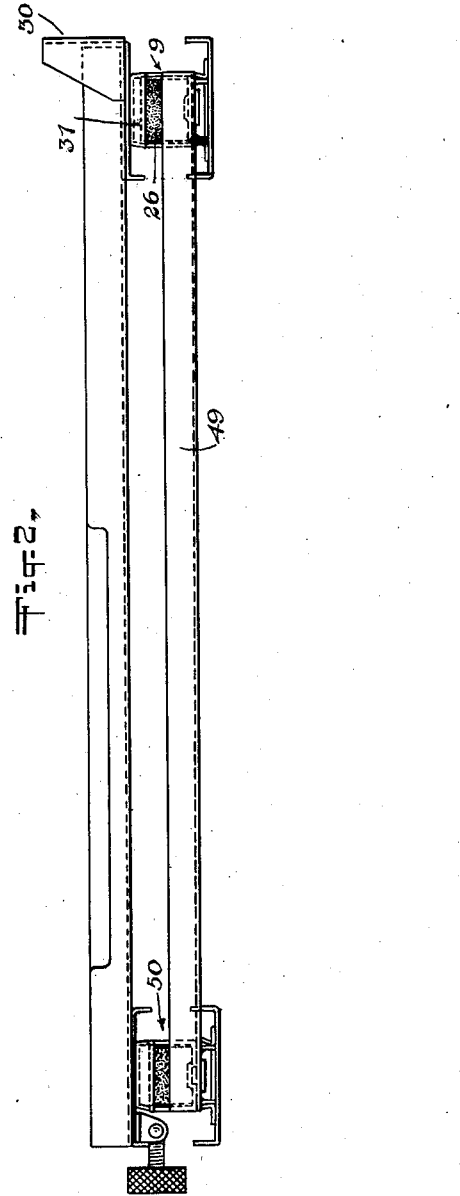
Fig. 2 is a side view thereof.

In the construction shown, an assembly such as has just been described is provided at either end of the tray 30, one such assembly being designated by the numeral 9 in Figure 2 and the other by the numeral 50. These assemblies may be connected by the connecting angle 49 which connects the respective beams to form a rectangular member. The shape of this member is not limited to a rectangle but will be varied in accordance with the object to be supported.

In the forms shown in Figures 1, 2 and 3 it will be noted that the beam supporting cushions are located inside of the tray supporting cushions. In the forms shown in Figures 4, 5 and 6 the beam supporting cushions are located outside of the tray supporting cushions and the retaining studs holding the beam member to the base bracket are more centrally located. As shown in Figure 4 the base bracket is provided with cushions 61 and 62 which are engaged by the beam 63. Beam 63 is so formed that it has a section 64 at either end to engage the cushions 61 and 62, a depressed portion 65 which engages the cushions 66 and 67, a raised portion 68 adapted to accommodate the buffers 69 and 70 and a lowered portion 71 adapted to engage the retaining buffers 72 and 73. As shown in Fig. 6 these buffers consist of a stud 75 mounted in the tray assembly 76 and extending thru the beam 63 thru an opening larger than the stud 75. A buffer cushion 77 above the beam 63 and a second buffer cushion 78 carried on the plate 79 on the stud 75 below the beam 63 provide for the absorption of excessive vibrations and act as ultimate limit stops in the same manner as the buffers 38, 39 and plate 40 previously described. With proper clearance they do not interfere with ordinary vibrations of a normal operating amplitude. It will be noted that this assembly occupies a shorter space than the pin 75 so that the beam and tray are free to move on the supporting cushions to considerable extent without being restrained by the buffers.

While I have shown the cushions as being substantially square in shape they may be of any desired contour. Similarly they may be made of rubber, felt, or any resilient material. If desired spring elements could be substituted for the cushions. However, where the device is to be used in varying temperatures and atmospheric conditions molded rubber cushions are believed to make the most satisfactory resilient element.

It will be seen that in both forms of my device I have arranged cushions in pairs with a primary and secondary pair of cushions. In the form shown in Figures 1, 2 and 3 the primary cushions 15 and 16 support the beam 17 and are located within the secondary cushions 25 and 26. In the form shown in Figures 4, 5 and 6 primary cushions 61 and 62 are located outside of the secondary cushions 66 and 67. Vibrations and shocks, whether vertical, lateral or longitudinal, are absorbed to a great extent by the primary cushions in each case. The secondary cushions absorb the greater portion of the residual vibration so that the amplitude remaining, which is passed along to the objects supported, is ordinarily less than five percent of the amplitude of the original exciting impulse. Furthermore, the buffers 35, 36, 69, 70 operate in conjunction with the other cushions so as to avoid the introduction of secondary or harmonic vibrations when shocks or excessive vibrations overload the normal operating system.

In prior shock absorbing mountings it has been customary to mount an instrument at the four corners thereof, the mountings being positioned adjacent to the longitudinal and diagonal axis of the instruments, thus supporting the instrument without regard to the center of gravity thereof.

In both forms of mounts the shock absorbing cushions are spaced at predetermined distances from the neutral axis of the mass of the equipment suspended. The efficiency of the mounting is increased since cushions act at points of reduced motion of the actuating impulses in the case of rotation vibration. It will be appreciated that by shortening the beam 17 or the beam 63 the distance from one neutral axis may be lessened while the distance from the other neutral axis in the same plane may be lengthened or shortened by moving the cushions toward or away from the center of the mass. The exact point must be determined from the inertia of the mass, its size and weight, and stability balanced against the resonant point. The farther the cushions are placed from the neutral axis the higher the resonant point but the greater stability against rotational vibration. It will be noted that my structure departs thoroughly from the conventional four-corner suspension which in some cases actually increased the vibration. It will also be noted that the space occupied by the mounting is no greater than that which would be required by the four-corner suspension used in the past.

Because static and impact loads are carried without resorting to tensile stressing of the rubber nor bonding, the cushions will have a considerably longer life and, if necessary, may be replaced without the destruction of metal parts.

I claim:

1. In a vibration absorbing mounting a pair of base members at either end of said mounting, each of said base members having positioned thereon a pair of resilient cushions, a rigid intermediate frame mounted on said resilient cushions and extending between said base members, means restricting within limits the movement of said intermediate frame on said base member, a pair of resilient members mounted on said intermediate member at either end thereof, a tray mounted on said resilient members and means between said tray on said intermediate frame for restricting within limits the movement between said tray and said intermediate frame.

2. A vibration absorbing mounting including a tray assembly, a plurality of base members and a rigid intermediate frame, a plurality of resilient members mounted on said base members supporting said intermediate frame, a second series of resilient members on said intermediate frame supporting said tray assembly, means on said tray assembly and on said base member for limiting the movement of the respective members with relation to said intermediate member, said means including a restraining pin insulated from contact with said intermediate member.

3. A vibration limit check comprising in combination, a vibrating plate having an opening, a frame, a bolt attached to said frame and passing thru the opening in said plate, the opening being larger than the bolt so that the bolt and plate do not touch, a cushioning pad of elastic spongy material around said bolt and on one side of said plate, said pad being thinner than the clearance between the vibrating plate and the frame, a second cushioning pad of elastic spongy material around said bolt and on the other side of the vibrating plate, a backing plate secured to said bolt beyond the second pad, the second pad being thinner than the clearance between the vibrating plate and the backing plate, whereby low resonance for ordinary impacts is combined with mechanical security under shock.

CECIL S. ROBINSON.

REFERENCES CITED

The following references are of record in the file of this patent:

UNITED STATES PATENTS

| Number | Name | Date |
| --- | --- | --- |
| 2,235,158 | Krenzke | Mar. 18, 1941 |
| 2,338,323 | Fink | Jan. 14, 1944 |

FOREIGN PATENTS

| Number | Country | Date |
| --- | --- | --- |
| 313,871 | Great Britain | Apr. 23, 1929 |